Dec. 31, 1929. H. D. STEVENS 1,741,797
GROOVING TOOL
Filed May 16, 1925 2 Sheets-Sheet 1
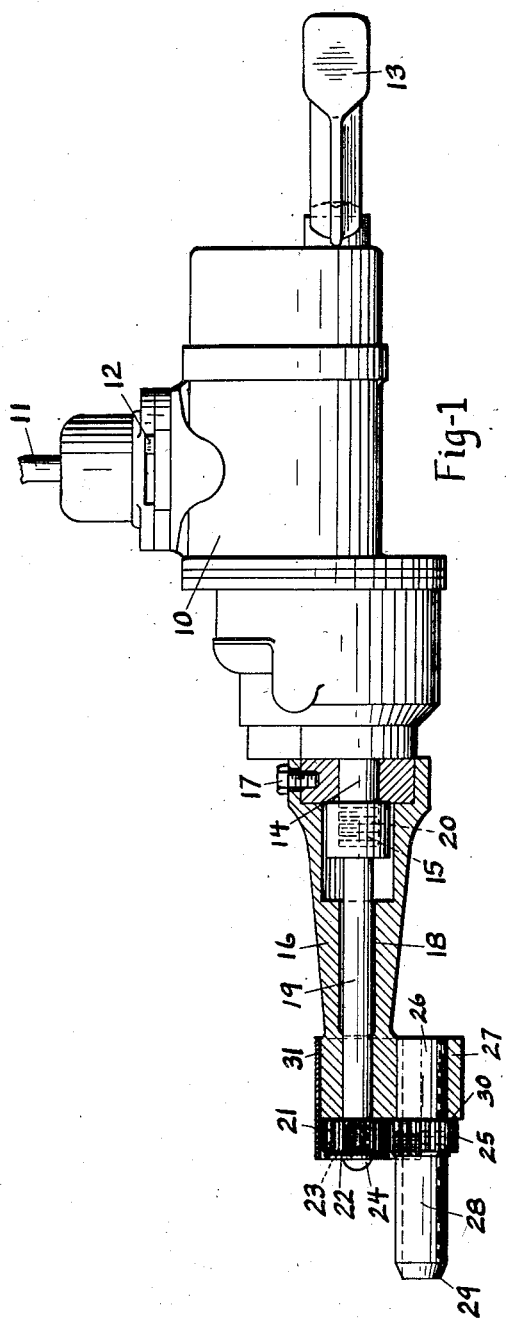
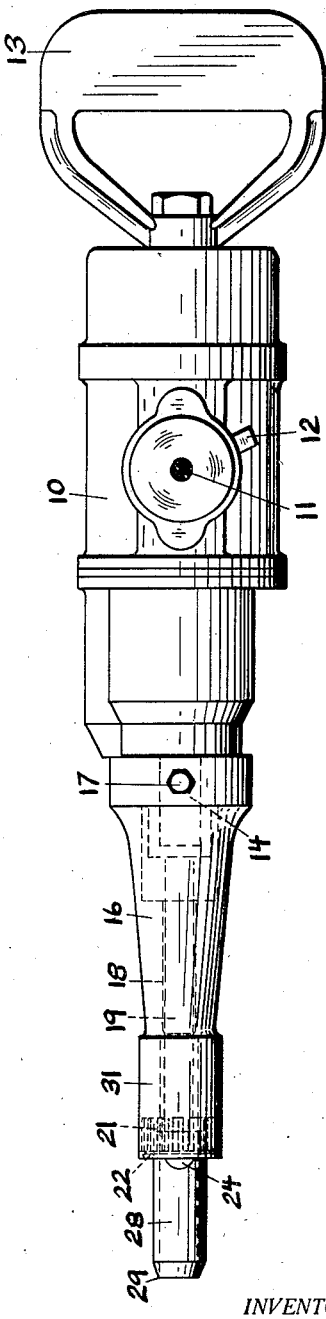
INVENTOR.
Horace D. Stevens
BY
ATTORNEY.

Dec. 31, 1929.  H. D. STEVENS  1,741,797
GROOVING TOOL
Filed May 16, 1925   2 Sheets-Sheet 2

INVENTOR.
Horace D. Stevens
BY
ATTORNEY.

Patented Dec. 31, 1929

1,741,797

UNITED STATES PATENT OFFICE

HORACE D. STEVENS, OF AKRON, OHIO, ASSIGNOR TO THE FIRESTONE TIRE AND RUBBER COMPANY, OF AKRON, OHIO, A CORPORATION OF OHIO

GROOVING TOOL

Application filed May 16, 1925. Serial No. 30,885.

This invention relates to grooving tools and particularly to power driven tools adapted for grooving various materials such as rubber.

The chief object of the invention is to provide a grooving tool for use on various materials, particularly rubber, and so constructed that the material cut out of the groove will pass through the tool in line with the action of the tool through the material to facilitate ease and accuracy in cutting.

A particular object of the invention is to provide a tool adapted to groove solid tires or to regroove worn solid tires of rubber to provide non-skid treads or grooved side walls or pockets to increase resilience of the tires.

Another object is to provide a tool capable of cutting a groove of any desired design in rubber or the like.

The foregoing and ancillary objects are obtained by the construction illustrated in the accompanying drawings and described in detail below. It is to be understood that the invention is not limited to the specific construction shown and described.

Of the accompanying drawings—

Figure 1 is a side elevation, partly in section, of a tool constructed in accordance with the invention;

Figure 2 is a plan thereof;

Figure 5:
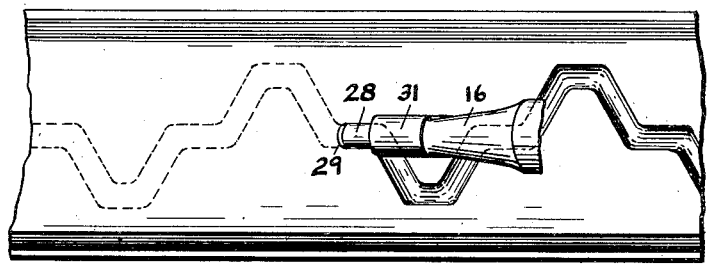
Figure 5 is a plan of a portion of a solid tire illustrating the manner of operating the tool thereon.

Referring to the drawings, the numeral 10 designates a conventional electrical motor used for various types of power driven tools. The motor 10 is connected to a source of electrical energy by a lead 11 and is controlled by a switch 12. Secured on the rear of the casing of the motor is a handle 13 by which one end of the tool unit can be supported. At 14 is shown the usual tool driving shaft having a threaded end 15.

To provide the tool of the present invention, a tubular bracket 16 is adapted to be secured as by cap screws indicated at 17 to a portion of the motor casing 10 about the end of shaft 14. Bracket 16 has a bore 18 therein in which is journaled a shaft 19 aligned with shaft 14 and secured thereto by a threaded socket 20 engaged on the threaded end of shaft 14.

Shaft 19 projects from the free end of bracket 16 and has a gear 21 threaded thereon and held in place by a cap 22 rotatively secured to said gear by a pin 23 and secured to said shaft by a screw 24. Meshed with gear 21 is a gear 25 formed on a sleeve 26 journaled in an offset 27 formed on bracket 16 preferably to extend downwardly therefrom. Sleeve 26 is open at both ends and in its forward end threadedly receives a rotary tubular knife 28 formed with a cutting edge at 29.

Cap 22 overlaps gear 25 and accordingly restrains sleeve 26 in offset 27 against movement in one direction, a shoulder 30 on said sleeve restrains sleeve 26 from movement in the other direction. A U-shaped guard plate 31 is secured on bracket 16 so as to overlie gears 21 and 25.

Figure 6:
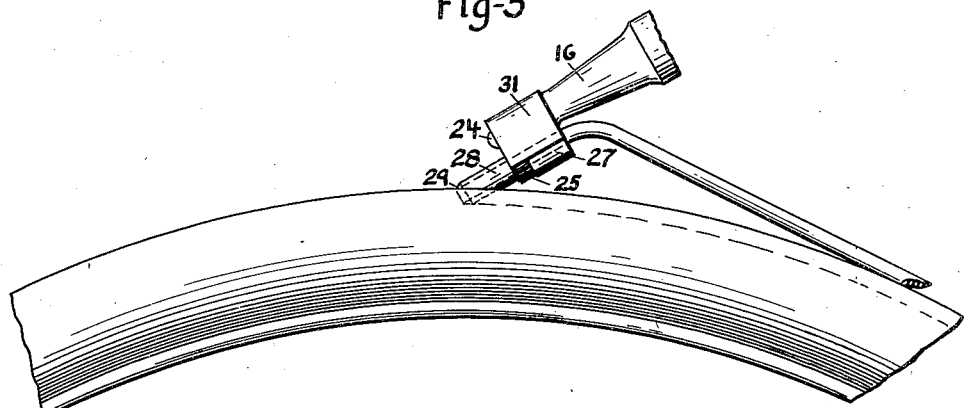
Figure 6 is a side elevation thereof.
Figure 3:
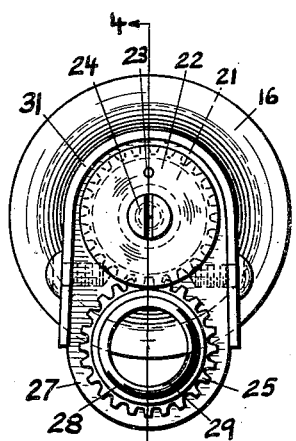
Figure 3 is an end elevation thereof.
Figure 4:
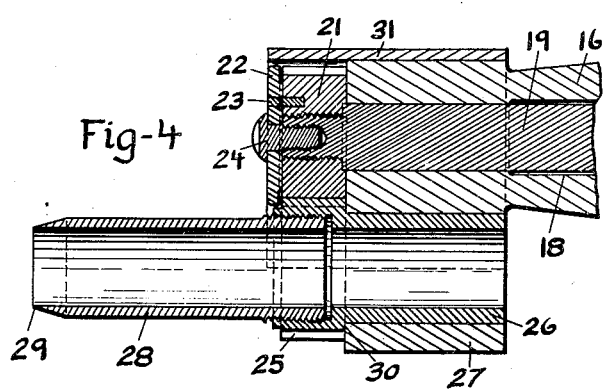
Figure 4 is a detail section of the tool driving and mounting means taken on the line 4, 4 of Figure 3.

In use for regrooving tires, as shown in Figures 5 and 6, the tool may be manually operated by grasping handle 13 and bracket 16 and caused to cut a groove in any desired path in the surface of the tire, the knife 28 being rapidly rotated by the motor 10. The tool is held at an inclination to the work as shown and forced through the work, the material cut out of the groove, instead of being pushed aside thereby, passing through the knife 28 and sleeve 26 and accordingly affording a minimum of resistance to the grooving action. In the case of rubber, the material usually passes out of the rear end of sleeve 26 in a continuous strip as shown in Figure 6. The application of water on the tire and about the knife prior to or during the cutting action will facilitate the cutting.

It will appear from the foregoing that a simple effective device has been provided which will rapidly and accurately cut a groove in material along any desired path and without requiring the use of such great force as is required in cutting and pushing the material aside by old forms of cutters.

Knife 28 is readily removable for resharpening or replacement.

Modifications of the invention may be resorted to without departing from the spirit thereof or the scope of the appended claims.

What I claim is:

1. A device of the character described, comprising a motor, a handle on one end of the motor, a tubular bracket on the other end of the motor, said bracket having an offset thereon formed with a bore, a shaft in said bracket connected to the shaft of the motor, a tubular cutting tool unobstructed throughout its length to permit cut material to pass therethrough, said tool being journaled in said bore, and gearing connecting the first shaft to the tool.

2. An attachment for a portable motor, comprising a tubular bracket adapted to be secured to the motor in alignment with the motor shaft and having an offset thereon provided with a bore extending through the offset, a shaft in said bracket adapted to be connected to the motor shaft, a gear on said bracket shaft, a tubular cutting tool unobstructed throughout its length to permit material to pass therethrough, said tool being journaled in said bore and a gear on said tool meshed with said first gear.

3. An attachment for a portable motor having a handle on one end, comprising a tubular bracket adapted to be secured to the other end of the motor in alignment with the motor shaft and having an offset thereon formed with a bore completely therethrough, a shaft in said bracket adapted to be connected to the motor shaft, a gear on said bracket shaft, a tubular cutting tool unobstructed throughout its length to permit cut material to pass therethrough, said tool being journaled in said bore, and a gear on said tool meshed with said first gear.

4. A cutting tool construction including a support formed with an offset having a bore extending completely therethrough, a tubular cutting tool journaled in said bore, said tool being unobstructed throughout its length to permit the cut material to pass through the off-set, and positive means for driving the tool.

5. A cutting tool construction comprising a support, an offset bearing mounted on said support, a tubular cutting tool journaled in said bearing, and a gear surrounding and affixed to said tool for rotating the same, said bearing, tool and gear having an unobstructed passage throughout to permit cut material to pass therethrough.

HORACE D. STEVENS.